(12) United States Patent
Bharat et al.

(10) Patent No.: US 8,352,499 B2
(45) Date of Patent: Jan. 8, 2013

(54) SERVING ADVERTISEMENTS USING USER REQUEST INFORMATION AND USER INFORMATION

(75) Inventors: Krishna Bharat, Santa Clara, CA (US); Steve Lawrence, Mountain View, CA (US); Mehran Sahami, Redwood City, CA (US); Amit Singhal, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 10/452,791

(22) Filed: Jun. 2, 2003

(65) Prior Publication Data
US 2012/0095837 A1    Apr. 19, 2012

(51) Int. Cl.
*G06F 17/00* (2006.01)
(52) U.S. Cl. ......... 707/791; 707/802; 707/822; 707/828
(58) Field of Classification Search ................ 707/1–10, 707/100–104.1, 600–899, 200–205
See application file for complete search history.

(56) References Cited

U.S. PATENT DOCUMENTS

| | | |
|---|---|---|
| 5,724,521 A | 3/1998 | Dedrick |
| 5,740,549 A | 4/1998 | Reilly et al. |
| 5,848,397 A | 12/1998 | Marsh et al. |
| 5,948,061 A | 9/1999 | Merriman |
| 6,026,368 A | 2/2000 | Brown et al. |
| 6,044,376 A | 3/2000 | Kurtzman, II |
| 6,078,914 A | 6/2000 | Redfern |
| 6,134,532 A | 10/2000 | Lazarus et al. |
| 6,144,944 A | 11/2000 | Kurtzman, II et al. |
| 6,167,382 A | 12/2000 | Sparks et al. |
| 6,269,361 B1 | 7/2001 | Davis et al. |
| 6,401,075 B1 | 6/2002 | Mason et al. |
| 6,505,196 B2 * | 1/2003 | Drucker et al. .................. 707/5 |
| 6,985,882 B1 | 1/2006 | Del Sesto |
| 7,039,599 B2 | 5/2006 | Merriman et al. |
| 7,136,875 B2 | 11/2006 | Anderson et al. |
| 7,725,424 B1 * | 5/2010 | Ponte ............................ 707/715 |
| 2002/0198882 A1 | 12/2002 | Linden et al. |
| 2003/0055831 A1 * | 3/2003 | Ryan et al. .................... 707/100 |

FOREIGN PATENT DOCUMENTS

| | | |
|---|---|---|
| JP | 2000-20555 | 1/2000 |
| JP | 2000-020555 | 1/2000 |
| JP | 2001-344270 | 12/2001 |
| JP | 2003-150844 | 5/2003 |

(Continued)

OTHER PUBLICATIONS

Brief Communication: Oral Proceeding for European Application No. 04 776 219.0, mailed Nov. 18, 2009 (4 pgs.).

(Continued)

*Primary Examiner* — Isaac M Woo
(74) *Attorney, Agent, or Firm* — John C. Pokotylo; Straub & Pokotylo

(57) ABSTRACT

Ads are scored using, at least, user information and information associated with a user request, such as a search query or a document request. The scores may be used in determining whether to serve ads, how to serve ads, to order ads, to filter ads, etc. Items of user information, request-associated information, and/or ad information can be weighted based on previous uses of such information in the serving of ads and the performance of those served ads.

59 Claims, 11 Drawing Sheets

FOREIGN PATENT DOCUMENTS

| KR | 2001-80633 | 8/2001 |
|----|-----------|--------|
| KR | 2001-1002668 | 11/2001 |
| WO | WO 97/21183 | 6/1997 |
| WO | WO 00/33224 | 6/2000 |
| WO | WO01/67319 | 9/2001 |

OTHER PUBLICATIONS

Decision to Refuse a European Patent Application for European Application No. 04 776 219.0, (with enclosures) mailed Dec. 12, 2009 (12 pgs.).
Provision of the Minutes in accordance with Rule 124(4) EPC for European Application No. 04 776 219.0, mailed Dec. 12, 2009 (5 pgs.).
Canadian Office Action to Canadian Patent Application No. 2,526,386, dated Dec. 23, 2009 (6 pgs.).
Notification of the First Office Action for Chinese Patent Application No. 201010202846.5, mailed Jun. 9, 2011 (5 pgs.) with partial translation (2 pgs.).
U.S. Appl. No. 95/001,073, Reexamination of Stone et al.
U.S. Appl. No. 95/001,061, Reexamination of Stone et al.
U.S. Appl. No. 95/001,069, Reexamination of Stone et al.
U.S. Appl. No. 95/001,068, Reexamination of Stone et al.
Dedrick, R., Interactive Electronic Advertising, IEEE, 1994.
Dedrick, R., A Consumption Model for Targeted Electronic Advertising, Intel Architecture Labs, IEEE, 1995.
Baseview Products, Inc., ClassManagerPro Administration Manual v. 1.0.5, Feb. 1, 1997.
Ad-Star.com website archive from www.Archive.org, Apr. 12, 1997 and Feb 1, 1997.
Information Access Technologies, Inc., Aaddzz brochure, "The Best Way to Buy and Sell Web Advertising Space," © 1997.
Information Access Technologies, Inc., Aaddzz.com website archive from www.Archive.org, archived on Jan. 30, 1998.
AdKnowledge Market Match Planner: Reviewer's Guide, AdKnowledge, May 1998.
AdKnowledge Campaign Manager: Reviewer's Guide, AdKnowledge, Aug. 1998.
Baseview Products, Inc., AdManagerPro Administration Manual v. 2.0, Dec. 1998.
AdForce, Inc., A Complete Guide to AdForce, Version 2.6, 1998.
AdForce, Inc., S-1/A SEC Filing, May 6, 1999.
Business Wire, "Global Network, Inc. Enters Into Agreement in Principle With Major Advertising Agency," Oct. 4, 1999.
Zeff, R. et al., *Advertising on the Internet*, 2$^{nd}$ Ed., John Wiley & Sons, 1999.
Request for Reexamination of U.S. Patent No. 7,240,025 B2, Control No. 95/001,073.
Request for Reexamination of U.S. Patent No. 6,446,045 B1, Control No. 95/001,061.
Request for Reexamination of U.S. Patent No. 7,249,059 B2, Control No. 95/001,069.
Request for Reexamination of U.S. Patent No. 6,829,587 B2, Control No. 95/001,068.
Statement Regarding References in 1449 Form.
PCT/ISA/220, "Notification of Transmittal of the International Search Report and the Written Opinion of the International Searching Authority, or the Declaration" for PCT/US04/17263, mailed Mar. 11, 2005 (2 pgs.).
PCT/ISA/210, "International Search Report" for PCT/US04/17263, mailed Mar. 11, 2005 (3 pgs.).
PCT/ISA/237, "Written Opinion of the International Searching Authority" for PCT/US04/17263, mailed Mar. 11, 2005 (6 pgs.).
Supplementary European Search Report for European Patent Application No. 04776219.0/2201, mailed Nov. 23, 2006 (3 pgs.).
Notice of Preliminary Rejection for Korean Patent Application No. 10-2005-7023117, mailed Dec. 6, 2006 (3 pgs.) with translation (3 pgs.).
EPO Communication for European Patent Application No. 04 776 219.0/2201, mailed Feb. 16, 2007 (7 pgs.).
Examiner's First Report for Australian Patent Application No. 2004248564, mailed Jul. 11, 2007 (1 pg.).
Second Examiner's Report for Indian Patent Application No. 2/CHENP/2006, mailed Nov. 2, 2007 (2 pgs.).
Notification of the First Office Action for Chinese Patent Application No. 200480019366.8, mailed Jan. 4, 2008 (7 pgs.) with translation (8 pgs.).
Notice of Preliminary Rejection for Korean Patent Application No. 10-2005-7023117, mailed Jan. 29, 2008 (3 pgs.) with translation (2 pgs.).
Second EPO Communication for European Patent Application No. 04 776 219.0-2201, mailed Feb. 1, 2008 (9 pgs.).
Notice of Reasons for Rejection for Japanese Patent Application No. 2006-515064, mailed Aug. 5, 2008 (4 pgs.) with translation (5 pgs.).
Decision of Rejection for Japanese Patent Application No. 2006-515064, mailed Dec. 2, 2008 (5 pgs.) with translation (6 pgs.).
Beaza-Yates, et al., "Modern Information Retrieval, Chapter 2: Modeling," Modern Information Retrieval, Harlow: Addison-Wesley, GB (1999) 58 pgs.
Notice of Reason for Rejection for Japanese Patent Application No. 2009-089188, mailed Sep. 6, 2011 (5 pgs.) with translation (5 pgs.).
Notification of Reexamination for Chinese Patent Application No. 200480019366.8, mailed on Mar. 31, 2010 (4 pgs.) (with English Translation (5 pgs.)).
Petitioner's Brief Against Korean Patent No. 861,673 (23 pgs.) (with summarized English translation (11 pgs.)).
Reply Brief for Invalidation Trial Against Korean Patent No. 861,673 (11 pgs.) (with English translation (11 pgs.)).
Request for Correction of Patent for Korean Patent No. 861,673 (77 pgs.) (with English translation of request portion only (2 pgs.)).
Summons to Attend Oral Proceeding for European Patent Application No. 04 776 219.0 (EPO Form 2008 04.09) (1 pg.) with Annex (EPO Form 2906 12 07CSX (8 pgs.), mailed Aug. 17, 2009.
Examiner's Report for Canadian Patent Application No. 2,526,386, mailed Dec. 1, 2011 (3 pgs.).

* cited by examiner

| AD ID | AD FEATURE 1 | AD FEATURE 2 | ... | AD FEATURE N |
|---|---|---|---|---|
| ... | ... | ... | . . . | ... |

| USER ID | USER FEATURE 1 | USER FEATURE 2 | ... | USER FEATURE M |
|---|---|---|---|---|
| ... | ... | ... | . . . | ... |

| REQUEST | REQUEST INFO. 1 | REQUEST INFO. 2 | ... | REQUEST INFO. P |
|---|---|---|---|---|

610  620

FIGURE 12
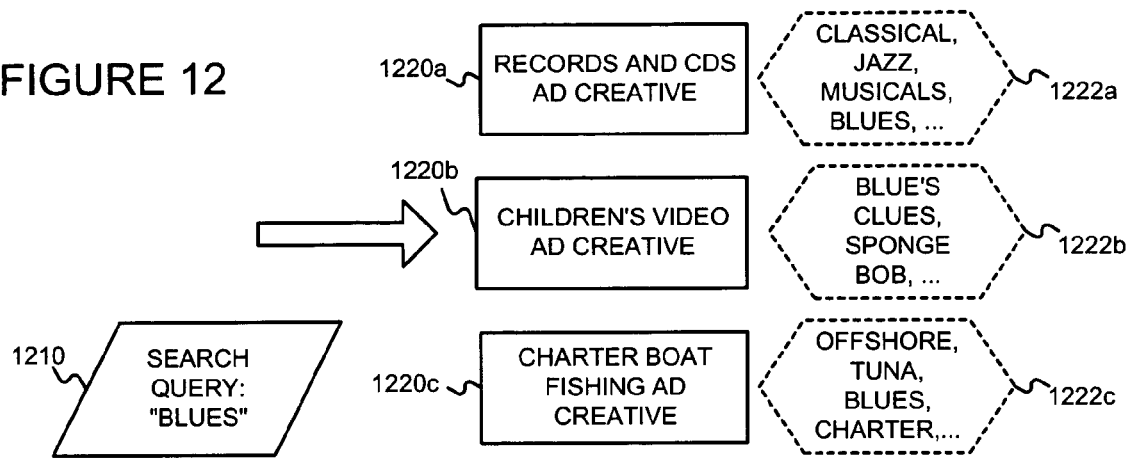
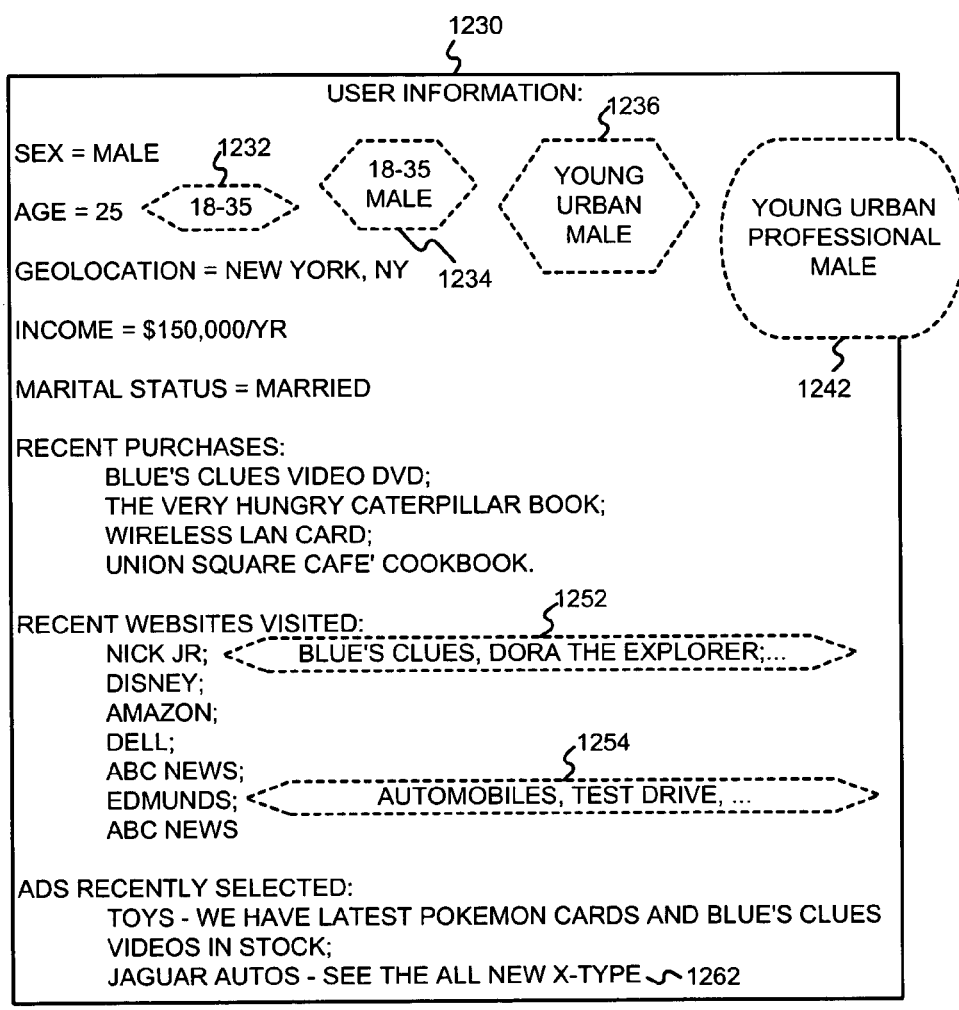

SERVING ADVERTISEMENTS USING USER REQUEST INFORMATION AND USER INFORMATION

§1. BACKGROUND OF THE INVENTION

§1.1 Field of the Invention

The present invention concerns advertising. In particular, the present invention concerns determining particularly relevant advertisements or advertisement creatives to serve in response to a user request, such as a search query or document request for example.

§1.2 Related Art

Advertising using traditional media, such as television, radio, newspapers and magazines, is well known. Unfortunately, even when armed with demographic studies and entirely reasonable assumptions about the typical audience of various media outlets, advertisers recognize that much of their ad budget is simply wasted. Moreover, it is very difficult to identify and eliminate such waste.

Recently, advertising over more interactive media has become popular. For example, as the number of people using the Internet has exploded, advertisers have come to appreciate media and services offered over the Internet as a potentially powerful way to advertise.

Advertisers have developed several strategies in an attempt to maximize the value of such advertising. In one strategy, advertisers use popular presences or means for providing interactive media or services (referred to as "Websites" in the specification without loss of generality) as conduits to reach a large audience. Using this first approach, an advertiser may place ads on the home page of the New York Times Website, or the USA Today Website, for example. In another strategy, an advertiser may attempt to target its ads to more narrow niche audiences, thereby increasing the likelihood of a positive response by the audience. For example, an agency promoting tourism in the Costa Rican rainforest might place ads on the ecotourism-travel subdirectory of the Yahoo Website.

Regardless of the strategy, Website-based ads (also referred to as "Web ads") are typically presented to their advertising audience in the form "banner ads" (i.e., a rectangular box that may include graphic components). When a member of the advertising audience (referred to as a "viewer" or "user" in the Specification without loss of generality) selects one of these banner ads by clicking on it, embedded hypertext links typically direct the viewer to the advertiser's Website. This process, wherein the viewer selects an ad, is commonly referred to as a "click-through" ("Click-through" is intended to cover any user selection).

Advertisers may judge the efficacy of an advertising campaign using a number of measurable or determinable user behaviors, such as click-throughs, click-through rates, conversions, conversion rates, etc. The ratio of the number of click-throughs to the number of impressions of the ad (i.e., the number of times an ad is displayed) is commonly referred to as the "click-through rate" of the ad. A "conversion" is said to occur when a user consummates a transaction related to a previously served ad. What constitutes a conversion may vary from case to case and can be determined in a variety of ways. For example, it may be the case that a conversion occurs when a user clicks on an ad, is referred to the advertiser's Web page, and consummates a purchase there before leaving that Web page. Alternatively, a conversion may be defined as a user being shown an ad, and making a purchase on the advertiser's Web page within a predetermined time (e.g., seven days). Many other definitions of what constitutes a conversion are possible. The ratio of the number of conversions to the number of impressions of the ad (i.e., the number of times an ad is displayed) is commonly referred to as the conversion rate. If a conversion is defined to be able to occur within a predetermined time since the serving of an ad, one possible definition of the conversion rate might only consider ads that have been served more than the predetermined time in the past.

Despite the initial promise of Website-based advertisement, there remain several problems with existing approaches. Although advertisers are able to reach a large audience, they are frequently dissatisfied with the return on their advertisement investment.

A popular recent trend has been to target ads to users based on some type of user request, such as the submission of a search query to a search engine. For example, the Google search engine Website allows advertisers to specify keywords for triggering the serving of an ad or a group of ads when those keywords, or some derivative thereof, are included in a search query.

In addition to the advertiser's goal of reaching a receptive audience, the hosts of Websites on which the ads are presented (referred to as "Website hosts" or "ad consumers") have the challenge of maximizing ad revenue without impairing their users' experience. Some Website hosts have chosen to place advertising revenues over the interests of users. One such Website is "Overture.com", which hosts a so-called "search engine" service returning advertisements masquerading as "search results" in response to user queries. The Overture.com Website permits advertisers to pay to position an ad for their Website (or a target Website) higher up on the list of purported search results. If schemes where the advertiser only pays if a user selects the ad (i.e., cost-per-click) are implemented, the advertiser lacks incentive to target their ads effectively, since a poorly targeted ad will not be selected and therefore will not require payment. Consequently, high cost-per-click ads show up near or at the top, but do not necessarily translate into real revenue for the ad publisher because viewers don't click on them. Furthermore, ads that users might otherwise select may be further down the list, or not on the list at all, and so the relevancy of ads is compromised.

Unfortunately, existing online advertising systems are often limited in their ability to serve relevant advertisements. Even online advertising systems that can serve generally relevant advertisements often cannot select relevant advertisements best suited for a particular user.

Accordingly, there is a need to improve the performance of online advertising. More specifically, there is a need to increase the relevancy of ads served in response to some user request, such as a search query or a document request for example, to the user that submitted the request. Doing so should increase the revenue of a Website host while simultaneously improving the experience of users.

§2. SUMMARY OF THE INVENTION

The present invention provides methods and apparatus for using both user information and information associated with a user request (e.g., a search query or a document request) in order to better target advertisements to the user. By using such user information and request-associated information, significant advantages are achievable over existing methods. This results from the fact that when the user submits a request to a system, they are providing some articulation of an information need at that moment, to which there may be some set of relevant advertisements. The present invention refines this ad serving process by also considering user information such as the user's previous behavior (e.g., selecting particular ads, viewing particular portions of a Website, etc.) and/or user profile information (e.g., demographics). By refining the targeting of ads in this way, the performance of such ads (e.g., in terms of click-through rate, conversion rate, etc.) should improve. The present invention may also use such user information and request-associated information to customize the creative content of ads served for presentation to the user.

§3. BRIEF DESCRIPTION OF THE DRAWINGS

FIGS. 4-6 are diagrams illustrating exemplary data structures that may be used to store information in a manner consistent with the present invention.

FIGS. 11 and 12 are illustrations of an exemplary application of the present invention to ad selection.

§4. DETAILED DESCRIPTION

The present invention may involve novel methods, apparatus, message formats and/or data structures for determining particularly relevant advertisements or advertisement creatives, using user information, such as user behavior and/or user profile information, as well as information associated with a user request, such as information associated with a search query or document request. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventors regard their invention as any patentable subject matter described.

In the following, environments in which, or with which, the present invention may operate are described in §4.1. Then, exemplary embodiments of the present invention are described in §4.2. Examples illustrating operations of exemplary embodiments of the present invention are described in §4.3. Finally, some conclusions regarding the present invention are set forth in §4.4.

§4.1 ENVIRONMENTS IN WHICH, OR WITH WHICH, THE PRESENT INVENTION MAY OPERATE

§4.1.1 Exemplary Advertising Environment

Figure 1:
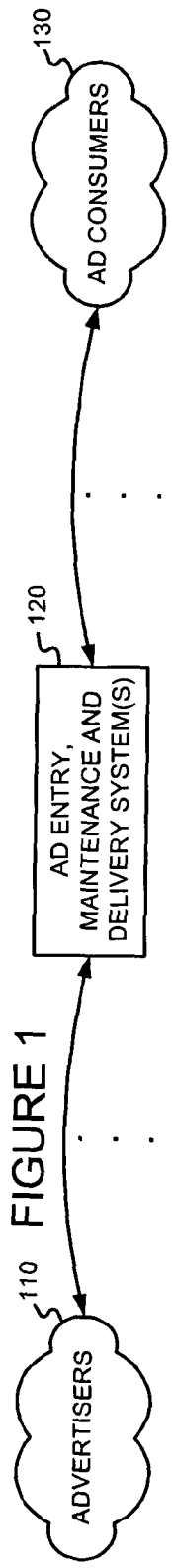
FIG. 1 is a high-level diagram showing parties or entities that can interact with an advertising system.

FIG. 1 is a high level diagram of an advertising environment. The environment may include an ad entry, maintenance and delivery system 120. Advertisers 110 may directly, or indirectly, enter, maintain, and track ad information in the system 120. The ads may be in the form of graphical ads such as so-called banner ads, text only ads, image ads, audio ads, video ads, ads combining one of more of any of such components, etc. The ads may also include embedded information, such as a link, and/or machine executable instructions. Ad consumers 130 may submit requests for ads to, accept ads responsive to their request from, and provide usage information to, the system 120. Although not shown, other entities may provide usage information (e.g., whether or not a conversion or click-through related to the ad occurred) to the system 120. This usage information may include measured or observed user behavior related to ads that have been served.

One example of an ad consumer 130 is a general content server that receives requests for content (e.g., articles, discussion threads, music, video, graphics, search results, web page listings, etc.), and retrieves the requested content in response to, or otherwise services, the request. The content server may submit a request for ads to the system 120. Such an ad request may include a number of ads desired. The ad request may also include content request information. This information may include the content itself (e.g., page), a category corresponding to the content or the content request (e.g., arts, business, computers, arts-movies, arts-music, etc.), part or all of the content request, content age, content type (e.g., text, graphics, video, audio, mixed media, etc.), geolocation information, etc.

The content server may combine the requested content with one or more of the advertisements provided by the system 120. This combined information including the content and advertisement(s) is then forwarded towards the end user that requested the content, for presentation to the user. Finally, the content server may transmit information about the ads and how, when, and/or where the ads are to be rendered (e.g., position, click-through or not, impression time, impression date, size, conversion or not, etc.) back to the system 120. Alternatively, or in addition, such information may be provided back to the system 120 by some other means.

Another example of an ad consumer 130 is a search engine. A search engine may receive queries for search results. In response, the search engine may retrieve relevant search results (e.g., from an index of Web pages). An exemplary search engine is described in the article S. Brin and L. Page, "The Anatomy of a Large-Scale Hypertextual Search Engine," Seventh International World Wide Web Conference, Brisbane, Australia and in U.S. Pat. No. 6,285,999 (both incorporated herein by reference). Such search results may include, for example, lists of Web page titles, snippets of text extracted from those Web pages, and hypertext links to those Web pages, and may be grouped into a predetermined number of (e.g., ten) search results.

The search engine may submit a request for ads to the system 120. The request may include a number of ads desired. This number may depend on the search results, the amount of screen or page space occupied by the search results, the size and shape of the ads, etc. In one embodiment, the number of desired ads will be from one to ten, and preferably from three to five. The request for ads may also include the query (as entered or parsed), information based on the query (such as geolocation information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores such as dot products of feature vectors corresponding to a query and a document, Page Rank scores, and/or combinations of IR scores and Page Rank scores), snippets of text extracted from identified documents (e.g., Web Pages), full text of identified documents, feature vectors of identified documents, etc.

The search engine may combine the search results with one or more of the advertisements provided by the system 120. This combined information including the search results and advertisement(s) is then forwarded towards the user that requested the content, for presentation to the user. Preferably, the search results are maintained as distinct from the ads, so as not to confuse the user between paid advertisements and presumably neutral search results.

Finally, the search engine may transmit information about the ad and when, where, and/or how the ad was to be rendered (e.g., position, click-through or not, impression time, impression date, size, conversion or not, etc.) back to the system 120. Alternatively, or in addition, such information may be provided back to the system 120 by some other means.

§4.1.2 Exemplary Ad Entry, Maintenance And Delivery Environment

Figure 2:
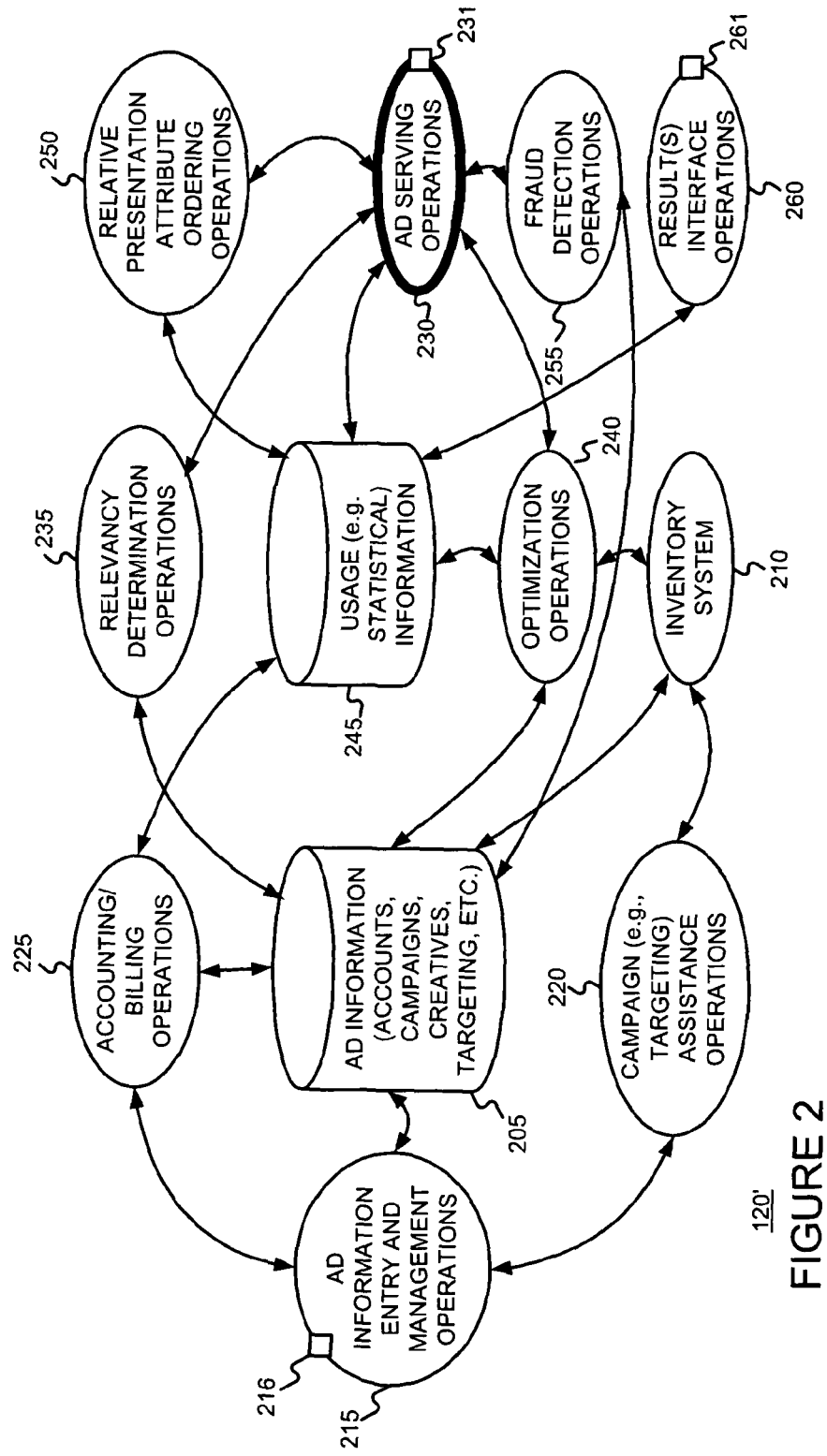
FIG. 2 is a bubble chart of an exemplary advertising environment in which, or with which, the present invention may operate.

FIG. 2 illustrates an exemplary ad system 120' in which, or with which, the present invention may be used. The exemplary ad system 120' may include an inventory system 210 and may store ad information 205 and usage information 245. The exemplary system 120' may support ad information entry and management operations 215, campaign (e.g., targeting) assistance operations 220, accounting and billing operations 225, ad serving operations 230, relevancy determination operations 235, optimization operations 240, relative presentation attribute assignment (e.g., position ordering) operations 250, fraud detection operations 255, and result interface operations 260.

Advertisers 110 may interface with the system 120' via the ad information entry and management operations 215 as indicated by interface 216. Ad consumers 130 may interface with the system 120' via the ad serving operations 230 as indicated by interface 231. Ad consumers 130 and/or other entities (not shown) may also interface with the system 120' via results interface operations 260 as indicated by interface 261.

An advertising program may include information concerning accounts, campaigns, creatives, targeting, etc. The term "account" relates to information for a given advertiser (e.g., a unique email address, a password, billing information, etc.). A "campaign" or "ad campaign" refers to one or more groups of one or more advertisements, and may include a start date, an end date, budget information, geo-targeting information, syndication information, etc. For example, Honda may have one advertising campaign for its automotive line, and a separate advertising campaign for its motorcycle line. The campaign for its automotive line have one or more ad groups, each containing one or more ads. Each ad group may include a set of keywords, and a maximum cost bid (cost per click-though, cost per conversion, etc.). Alternatively, or in addition, each ad group may include an average cost bid (e.g., average cost per click-through, average cost per conversion, etc.). Therefore, a single maximum cost bid and/or a single average cost bid may be associated with one or more keywords. As stated, each ad group may have one or more ads or "creatives" (That is, ad content that is ultimately rendered to an end user). Naturally, the ad information 205 may include more or less information, and may be organized in a number of different ways.

The ad information 205 can be entered and managed via the ad information entry and management operations 215. Campaign (e.g., targeting) assistance operations 220 can be employed to help advertisers 110 generate effective ad campaigns. For example, the campaign assistance operations 220 can use information provided by the inventory system 210, which, in the context of advertising for use with a search engine, may track all possible ad impressions, ad impressions already reserved, and ad impressions available for given keywords.

The ad serving operations 230 may service requests for ads from ad consumers 130. The ad serving operations 230 may use relevancy determination operations 235 to determine candidate ads for a given request. The ad serving operations 230 may then use optimization operations 240 to select a final set of one or more of the candidate ads. The ad serving operations 230 may then use relative presentation attribute assignment operations 250 to order the presentation of the ads to be returned. The accounting/billing operations 225 may be used to track charges related to the serving of advertisements and to bill advertisers. The fraud detection operations 255 can be used to reduce fraudulent use of the advertising system (e.g., by advertisers), such as through the use of stolen credit cards. Finally, the results interface operations 260 may be used to accept result information (from the ad consumers 130 or some other entity) about an ad actually served, such as whether or not click-through occurred, whether or not conversion occurred (e.g., whether the sale of an advertised item or service was initiated or consummated within a predetermined time from the rendering of the ad), etc. Such results information may be accepted at interface 261 and may include information to identify the ad and time the ad was served, as well as the associated result.

§4.1.3 Exemplary Network Environment

Figure 14:
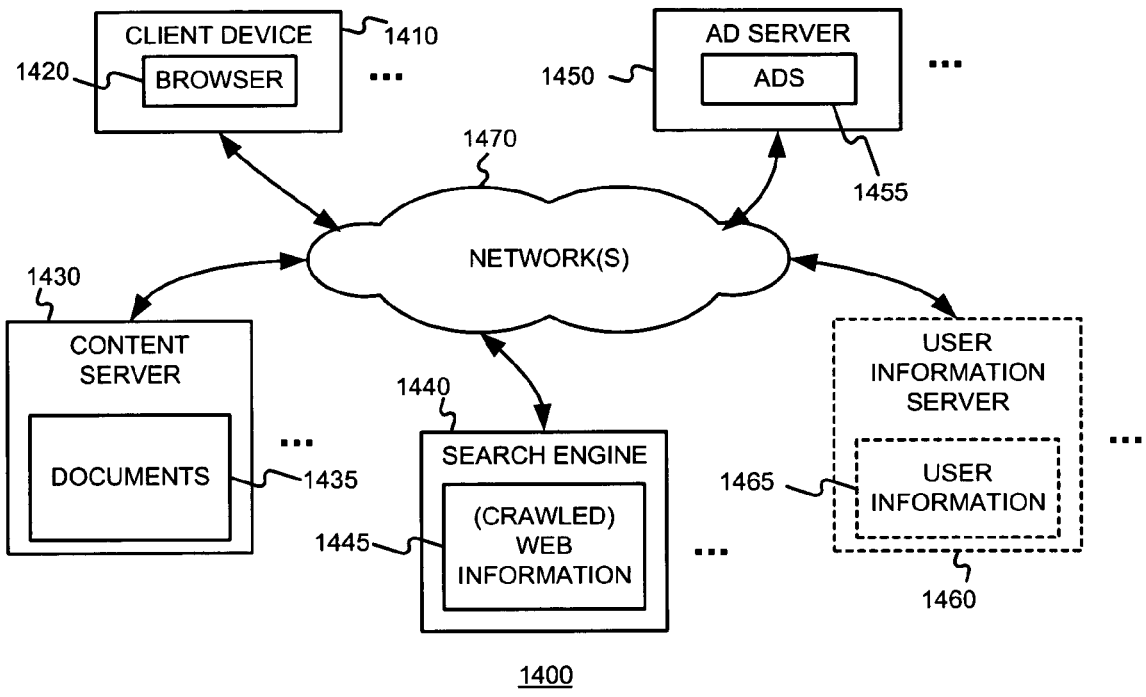
FIG. 14 illustrates an environment in which the present invention may be used.

FIG. 14 illustrates an exemplary network environment 1400 in which the present invention may be used. The exemplary network environment 1400 may include one or more client devices 1410, each having a browser 1420 (or some other information requesting and rendering means). The client devices 1410 can request documents 1435 served by one or more content servers 1420 and can search content included in those or other documents using one or more search engines 1440. An ad server 1450 can serve one or more ads 1455. The one or more ads 1455 served may be relevant to documents served by the content server 1430 (and/or the request for such documents) and/or relevant to search results generated by search engine 1440 (and/or the search query). User information (e.g., about a user or group of users associated with one or more client devices 1410) 1465 may be stored at one or more information servers 1460. Alternatively, or in addition, user information (not shown) may be stored at one or more content servers 1430, one or more search engines 1440, and/ or one or more ad servers 1450. The one or more client devices 1410, content servers 1430, search engines 1440, ad servers 1450, and/or user information servers 1460 may exchange information with one another via one or more networks 1470. The one or more networks 1470 may be the Internet and the servers and search engines may be computers. The user information (e.g., user profile database), an information index, and an advertisement index need not be separate repositories—they may be stored in a single repository. Moreover, these forms of data may be interleaved (for example, the advertisement database may include "user feature tags" on the ads so that only some subset are retrieved for particular types of users).

§4.1.4 Definitions

Online ads, such as those used in the exemplary systems described above with reference to FIGS. 1, 2, 14 or any other system, may have various intrinsic features. Such features may be specified by an application and/or an advertiser. These features are referred to as "ad features" below. For example, in the case of a text ad, ad features may include a title line, ad text, and an embedded link. In the case of an image ad, ad features may include images, executable code, and an embedded link. Depending on the type of online ad, ad features may include one or more of the following: text, a link, an audio file, a video file, an image file, executable code, embedded information, etc.

When an online ad is served, one or more parameters may be used to describe how, when, and/or where the ad was served. These parameters are referred to as "serving parameters" below. Serving parameters may include, for example, one or more of the following: features of (including information on) a page on which the ad was served, a search query or search results associated with the serving of the ad, a user characteristic (e.g., their geographic location, the language used by the user, the type of browser used, previous page views, previous behavior), a host or affiliate site (e.g., America Online, Google, Yahoo) that initiated the request that the ad was served in response to, an absolute position of the ad on the page on which it was served, a position (spatial or temporal) of the ad relative to other ads served, an absolute size of the ad, a size of the ad relative to other ads, a color of the ad, a number of other ads served, types of other ads served, time of day served, time of week served, time of year served, etc. Naturally, there are other serving parameters that may be used in the context of the invention.

Although serving parameters may be extrinsic to ad features, they may be associated with an ad as serving conditions or constraints. When used as serving conditions or constraints, such serving parameters are referred to simply as "serving constraints" (or "targeting criteria"). For example, in some systems, an advertiser may be able to target the serving of its ad by specifying that it is only to be served on weekdays, no lower than a certain position, only to users in a certain location, etc. As another example, in some systems, an advertiser may specify that its ad is to be served only if a page or search query includes certain keywords or phrases. As yet another example, in some systems, an advertiser may specify that its ad is to be served only if a document being served includes certain topics or concepts, or falls under a particular cluster or clusters, or some other classification or classifications.

"Ad information" may include any combination of ad features, ad serving constraints, information derivable from ad features or ad serving constraints (referred to as "ad derived information"), and/or information related to the ad (referred to as "ad related information"), as well as extensions of such information (e.g., information derived from ad related information).

A "document" is to be broadly interpreted to include any machine-readable and machine-storable work product. A document may be a file, a combination of files, one or more files with embedded links to other files, etc.; the files may be of any type, such as text, audio, image, video, etc. Parts of a document to be rendered to an end user can be thought of as "content" of the document. Ad spots in the document may be defined by embedded information or instructions. In the context of the Internet, a common document is a Web page. Web pages often include content and may include embedded information (such as meta information, hyperlinks, etc.) and/or embedded instructions (such as Javascript, etc.). In many cases, a document has a unique, addressable, storage location and can therefore be uniquely identified by this addressable location. A universal resource locator (URL) is a unique address used to access information on the Internet.

"Document information" may include any information included in the document, information derivable from information included in the document (referred to as "document derived information"), and/or information related to the document (referred to as "document related information"), as well as extensions of such information (e.g., information derived from related information). An example of document derived information is a classification based on textual content of a document. Examples of document related information include document information from other documents with links to the instant document, as well as document information from other documents to which the instant document links.

"Request information" (also referred to as "request-associated information") may include any information included in, or derivable from, a request (such as a search query or a document request for example). For example, in the context of a search query request, request information may include terms or phrases in the search query, where the search query came from, the time (submitted or received) of the search query, a document returned in response to the search query, and document information of the returned document.

Content from a document may be rendered on a "content rendering application or device". Examples of content rendering applications include an Internet browser (e.g., Explorer or Netscape), a media player (e.g., an MP3 player, a Realnetworks streaming audio file player, etc.), a viewer (e.g., an Abobe Acrobat PDF reader), etc.

"User information" may include any information about a user or a group of users. User information may include user behavior information, user profile information, or both. Such information may be provided by the user, provided by a third party authorized to release user information, and/or derived from user actions. Certain user information can be deduced or presumed using other user information of the same user and/or user information of other users.

Various exemplary embodiments of the present invention are now described in §4.2.

§4.2 EXEMPLARY EMBODIMENTS

Figure 3:
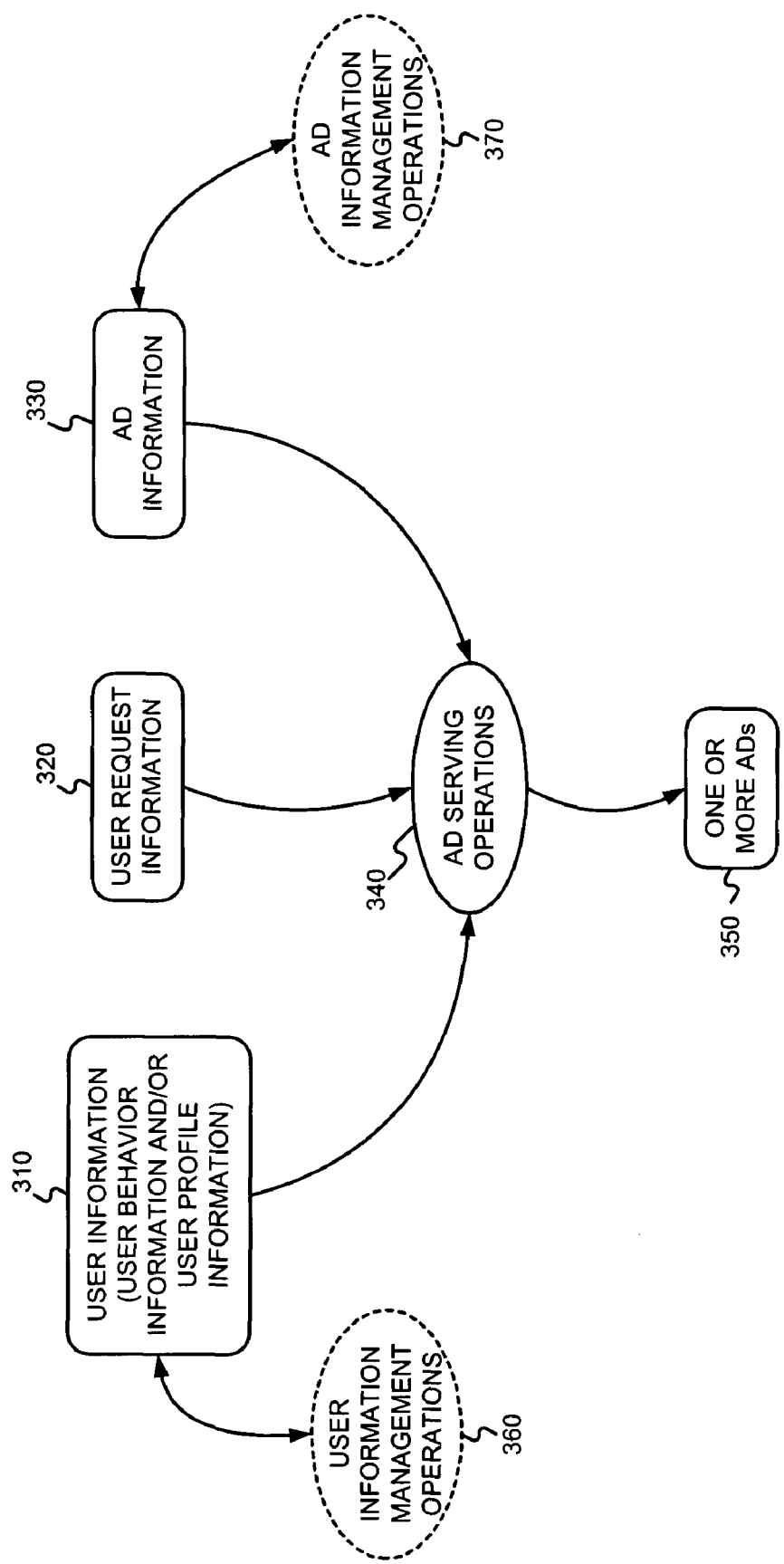
FIG. 3 is a bubble chart of operations, consistent with the present invention, that may be used in, or with, an online advertising environment, such as the one in FIG. 2.

FIG. 3 is a bubble diagram of operations that may be performed, and information that may be stored, in a manner consistent with the present invention. Ad serving operations 340 may use user information 310, user request (e.g., search query or document request) information 320 and ad information 330 to determine one or more ads 350. In one embodiment, the ad serving operations 340 use the user information 310, information associated with a user request (e.g., search query or document request) 320 and ad information 330 to determine particularly relevant ads. In another embodiment, the ad serving operations 340 use information associated with a user request 320 and ad information 330 to determine one or more ad groups or ad campaigns, and then use at least the user information 310 and/or the ad information 330 to select (or determine) an ad creative within an ad group or ad campaign.

The user information management operations 360 may be used to manage and store user information efficiently. Similarly, ad information management operations 370 may be used to manage and store ad information efficiently.

§4.2.1 Exemplary Ad Information

FIG. 4 is an exemplary data structure 400 for storing ad information that may be used by the present invention. As shown, the ad information may include an ad identifier 410 and one or more ad features (also referred to as items of ad information) 420. In some embodiments of the present invention, at least some of the ad features 420 may be so-called targeting information or targeting criteria.

§4.2.1.1 Examples of Ad Information

Ad information features may include one or more of the following:
- demographic data targeting the ad to one or more particular user population segment (e.g. income information, neighborhood affluence, age, marital status, education level, children/no children, etc.);
- geographic data targeting the ad to one or more particular user population segments (e.g., zip code, country, state, residence address, etc.);
- psychographic data (e.g., social class, life style, personality characteristics, etc.) targeting the ad to one or more particular user population segments;
- information (textual or otherwise) from the creative of the advertisement;
- information (textual or otherwise) that are linked to by the advertisement;
- queries that tend to trigger the advertisement;
- ad targeting keywords;
- text from the advertiser's Website;
- Anchortext from links to the advertiser's Website;
- advertiser information such as location and shipping region;
- text from Websites or discussion groups discussing a product or service; and
- any other ad information.

Examples describing how such information can be obtained, and how and where such information can be stored, are described in §§4.2.1.2 and 4.2.1.3, respectively.

§4.2.1.2 Examples of How Ad Information is Obtained

Information, such as demographic, geographic, and/or psychographic information for example, targeting an ad to particular user population segments may be (a) provided directly by the advertiser, (b) garnered from third party information providers, and/or (c) inferred based on attributes or features of users, such as other users who tend to select such ads or purchase products or services after being presented with such ads, for example.

§4.2.1.3 Examples of How and Where Ad Information is Stored

Advertisement information can be represented by a variety of means, such as a vector of feature-value pairs, and stored in a data management system on an ad server. In such an embodiment of the present invention, the (weighted) vector of feature-value pairs can be matched with the (weighted) vector of feature-value pairs of user information, in conjunction with the user's current request (e.g., search query or document request) to create a score reflecting a degree of similarity between a given user and their current request to one or more advertisements.

In a refined embodiment of the present invention, ad information is stored as n-grams (sequences of words of length 1 to some maximum, e.g., 3) with an associated source (the n-gram may be from the targeting keywords, title of the advertiser Website, meta tags of the advertiser Website, etc.), URLs, categories (e.g., the ad is for a software product that works with Microsoft Windows), or specific values for different kinds of information (e.g., the business is located at a specific latitude and longitude). As is known in the art, an n-gram is a grammar representation of an $N^{th}$-order Markov language model in which the probability of occurrence of a symbol is conditioned on the prior occurrence of N−1 other symbols. N-gram grammars are typically constructed from statistics obtained from a large corpus of text using the co-occurrences of words in the corpus to determine word sequence probabilities. N-gram grammar models rely on the likelihood of sequences of words, such as word pairs (bigrams), word triples (trigrams), etc. An N-gram grammar model may be represented with a tree using a file format including lines of data tuples, each representing a branch and the succeeding node of the grammar tree. The branch data is a list of indices representing the word sequence of the N-gram. Following the word sequence data is a list of one or two integers representing the node branching factor and event count.

Referring back to the exemplary network environment of FIG. 14, ad information may be stored in an ad server 1450, although it may be stored elsewhere instead, or in addition.

§4.2.2 Exemplary User Information

FIG. 5 is an exemplary data structure 500 for storing user information that may be used by the present invention. As shown, the user information may include a user identifier 510 and one or more user features (also referred to as "items of user information") 520. In some embodiments of the present invention, the user features 520 may include user behavior information and/or user profile (e.g., demographic, geographic, psychographic) information. A value of a user feature may be quantitative (a discrete or continuous value, e.g., Age=58 years; Annual income=$55,000; City of residence=San Francisco, Calif.) or qualitative (in set or not in set, e.g., Salary $50,000-$100,000?=Yes; U.S. Resident?=Yes).

§4.2.1.1 Examples of User Information

User information features may include one or more of the following:
- the content (e.g., words, Anchortext, etc.) of Websites that the user has visited (or visited in a certain time period);
- demographic information;
- geographic information;
- psychographic information;
- previous queries (and/or associated information) that the user has made;
- information about previous advertisements that the user has been shown, has selected, and/or has made purchases after viewing;

information about documents (e.g., word processor) viewed/requested, and/or edited by the user;
user interests;
explicit or implicit feedback regarding the personalized results from the user (e.g., selecting a result, not selecting a result, the amount of time spent on a result, etc.);
browsing activity; and
previous purchasing behavior.

Such information may be stored on a per individual basis, or aggregated in various ways among various sets of people. Such information may be combined to obtain composite profiles.

§4.2.1.2 Examples of How User Information is Obtained

User information, such as demographic, geographic, and/or psychographic user information for example, may be (a) provided directly by the user, (b) garnered from third party information providers, (c) inferred based on other features of the user, and/or (d) inferred based on the features of other (e.g., similar) users.

§4.2.1.3 Examples of How and Where User Information is Stored

User information can be represented by a variety of means, such as a vector of feature-value pairs, and stored in any data management scheme, such as those described here for example. Such user information can then be used at run-time in conjunction with the information associated with the current user request to match against a potential set of advertisements to display. In one embodiment of the present invention, user information is stored as n-grams (sequences of words of length 1 to some maximum, e.g., 3) with an associated source (e.g., the n-gram is from a Web page viewed, a query, etc.), URLs, or specific values for different kinds of information (e.g., the user is using a particular web browser, or the user is located at a specific latitude and longitude, etc.).

The storage and use of user information may take various different forms, including (a) client-side storage (e.g., in the form of a browser cookie, local file, hidden form fields, or URL encoding), (b) server-side storage (e.g., a database of records, flat files, or proprietary structures for storing and retrieving profile/behavior information), and/or (c) third party storage. Thus, the user information need not reside in a repository on the server-side, but may actually be stored with the client and/or a third party and sent to the information server with the user's request (e.g., search query or document request). The user information can be sent, for example, in a web browser cookie.

Referring back to the exemplary network environment of FIG. 14, user information may be stored in one or more client devices 1420, one or more content servers 1430, one or more search engines 1440, one or more ad servers 1450, and/or one or more user information servers 1460. In any event, user information may be maintained by using some data management scheme (e.g., database, flat files, proprietary data management system, web browser cookies, etc.). Different items of user information (e.g., different user features) may be stored on different devices.

§4.2.3 Request-Associated Information

FIG. 6 is an exemplary data structure 600 for storing request-associated information that may be used by the present invention. As shown, the request-associated information may include a request identifier 610 and one or more items of information 620. The pieces of request information may include information associated with a search query, information associated with a requested document, information about the user that sourced the request, etc.

§4.2.4 Refinements to Information Storage

To achieve a practical system, it may become desirable or necessary to reduce the volume of, and/or to order, user information used in targeting advertisements. The present invention permits such reduction with minimal loss of information and accuracy. Further, since it may be desirable or necessary to constrain latency in the serving of ads, and consequently in the retrieval of user information, an ad server may need to operate in some cases with limited or no individual user information. Prioritization, in accordance with the present invention, allows an ad server to focus on valuable (e.g., the most valuable) information available during the targeting process. Exemplary techniques for data reduction and processing prioritization are described below.

In one embodiment of the present invention, each of at least some items of information has an associated importance weight. The importance weights for multiple features may be grouped together or aggregated in some manner. For example, the importance weight for all words on a Web page that a user has viewed may be grouped and adjusted together using the following technique.

Initially, the importance weight assigned to a piece of information may be determined using, perhaps among other things, a type of the information. For example search queries may have a higher initial weight than n-grams extracted from Web pages that a user has viewed.

Figure 9:
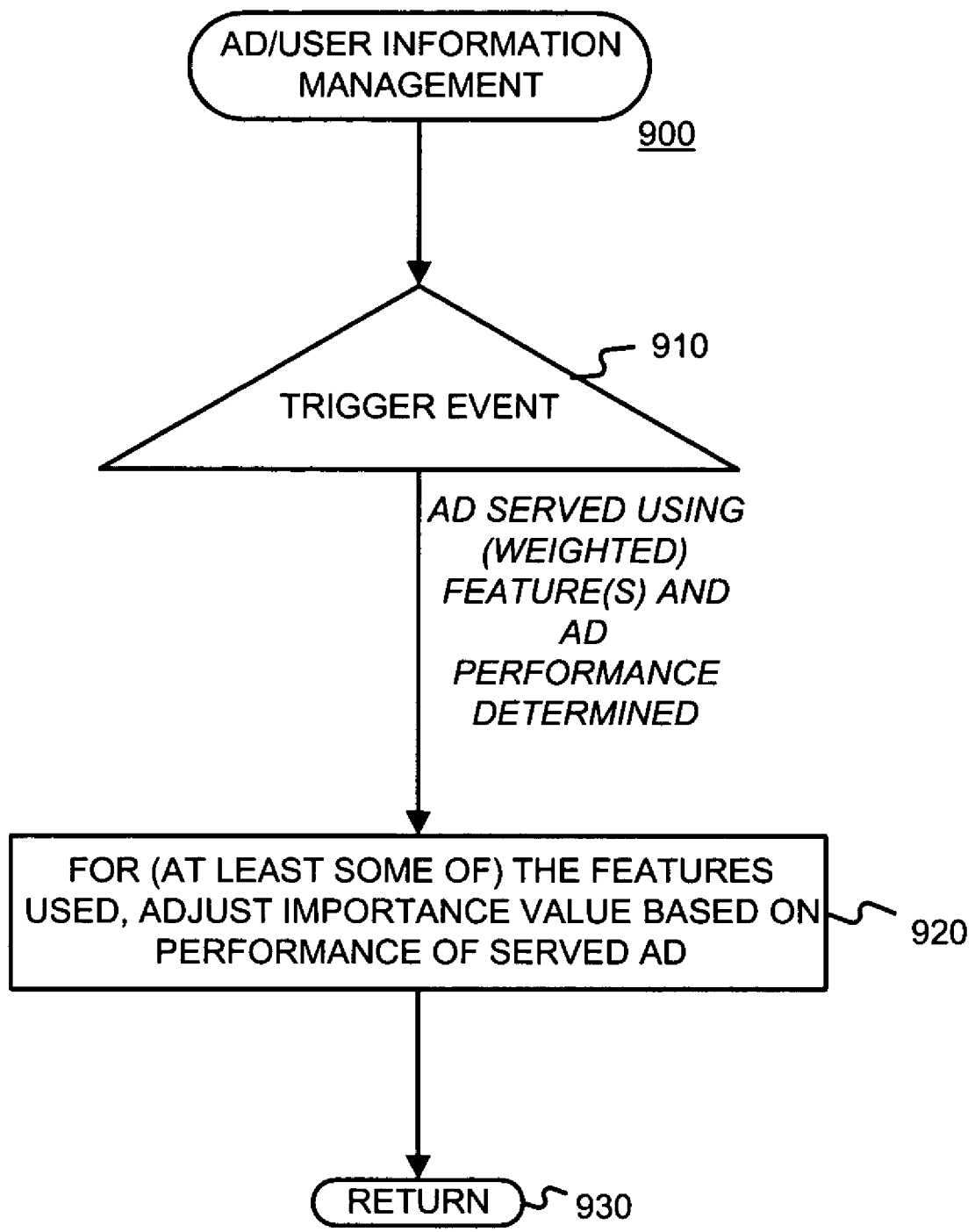
FIG. 9 is a flow diagram of an exemplary method that may be used to manage ad information or user information in a manner consistent with the present invention.

The importance weights for items of user information (e.g., user features) may be updated based on actions of a particular user or of groups of users. FIG. 9 is a flow diagram of an exemplary method 900 that may be used to manage ad information or user information in a manner consistent with the present invention. As indicated by trigger event block 910, the method 900 is effected when an ad is served and the selection of the ad served was made using (e.g., weighted) features. As indicated by block 920, for (at least some of) the features used, the importance weight of the feature is adjusted based on the performance of (e.g., selected or not) the served ad, before the method 900 is left via RETURN node 930. Thus, for example, if the user selects an ad, the importance weights of user information items that led to this ad being recommended may be increased. The amount(s) (absolute or relative) by which the importance weight(s) are increased may depend, at least in part, on how much each item of user information contributed to the ad recommendation score. Similarly, the importance weights of the relevant items of user information may be reduced when the user does not select the ad. In one embodiment of the present invention, the weight reduction factor is smaller than the weight increase factor.

In one embodiment of the present invention, importance weights may be optionally adjusted using (e.g., combined with) a global weight based on how often (in absolute and/or relative terms) the information item has resulted in a good recommendation across all users. Alternatively, or in addition, importance weights may be optionally adjusted using (e.g., combined with) a community weight based on how often (in absolute and/or relative terms) the information item has resulted in a good recommendation across a group of (e.g., all similar) users.

In one embodiment of the present invention, if a record or set of user information reaches a particular size, it may be reduced by deleting less important items of information using, at least, the importance weights. The storage requirements of the items of information may also be considered. In this way, an item of information that requires a lot of storage but that has a low importance weight would be a prime candidate for deletion.

One embodiment of the present invention can order (and even store) the individual information items using their importance weights. In such an embodiment, requests for user information for a given user may be served with truncated user information including only the most important (in terms of importance weights) items of information, or may be served in a piecemeal manner until enough information is obtained, and/or until further processing is undesirable or not possible. Thus, for example, processing using items of the user information may be done in the order of their importance weights. This permits processing to be terminated early (e.g., for efficiency, to meet some latency constraint and ensure that processing is completed within a specific time limit, etc.).

As new (items of) user information is added, the importance weights of existing items of information may be changed. Consequently, the order of items of user information (e.g., for a given user) may differ from the importance weight order. Therefore, the present invention may be used to reorder, periodically, the items of information using (e.g., according to) their respective importance weights.

In some cases, transfer or processing of the user information may be performed in accordance with an approximate order, before the user information (e.g., for a given user) is reordered using (e.g., in accordance with) importance weight. Note that in at least some instances and/or some embodiments, it may not be necessary to physically store items of information in the order of their respective importance weights for such information to be efficiently transferred and/or processed in that order. Indeed, in at least some instances and/or some embodiments, it may not be necessary to transfer and/or process information in importance order. For example, if conditions permit, all information may be transferred and/or processed.

§4.2.5 Refinements to Processing

Processing may be bifurcated, with a first processing phase processing as much of the user information (e.g., for a given user) as is possible within a given time limit, after which ad recommendations are presented to the end user. A second processing phase may then continue processing the remaining part of the user information until the entire set or record is processed, or until a second time limit is reached. By performing this further processing, adjustments made to importance weights of information items based on performance of the recommended ads can use the larger set or record as processed at the end of the second phase. Since the user profile is generally an approximation of the true interests of the user, the system will not normally have full and accurate information about the user. Consider an ad that would be recommended for a user based on either of two features in the user profile, say "Honda" and "S2000". Consider that only one of the features, "Honda", is processed in the first phase, with the other feature, "S2000", currently having lower importance in the profile. A "Honda S2000" ad may be recommended based solely on the first feature, and may result in a clickthrough on that ad. By providing the second phase of processing, it can be determined that the second feature would also have contributed to the ad being recommended, and the importance of that feature can therefore be adjusted using that contribution.

§4.2.5 Exemplary Applications

§4.2.5.1 Enhanced Ad Targeting

Figure 7:
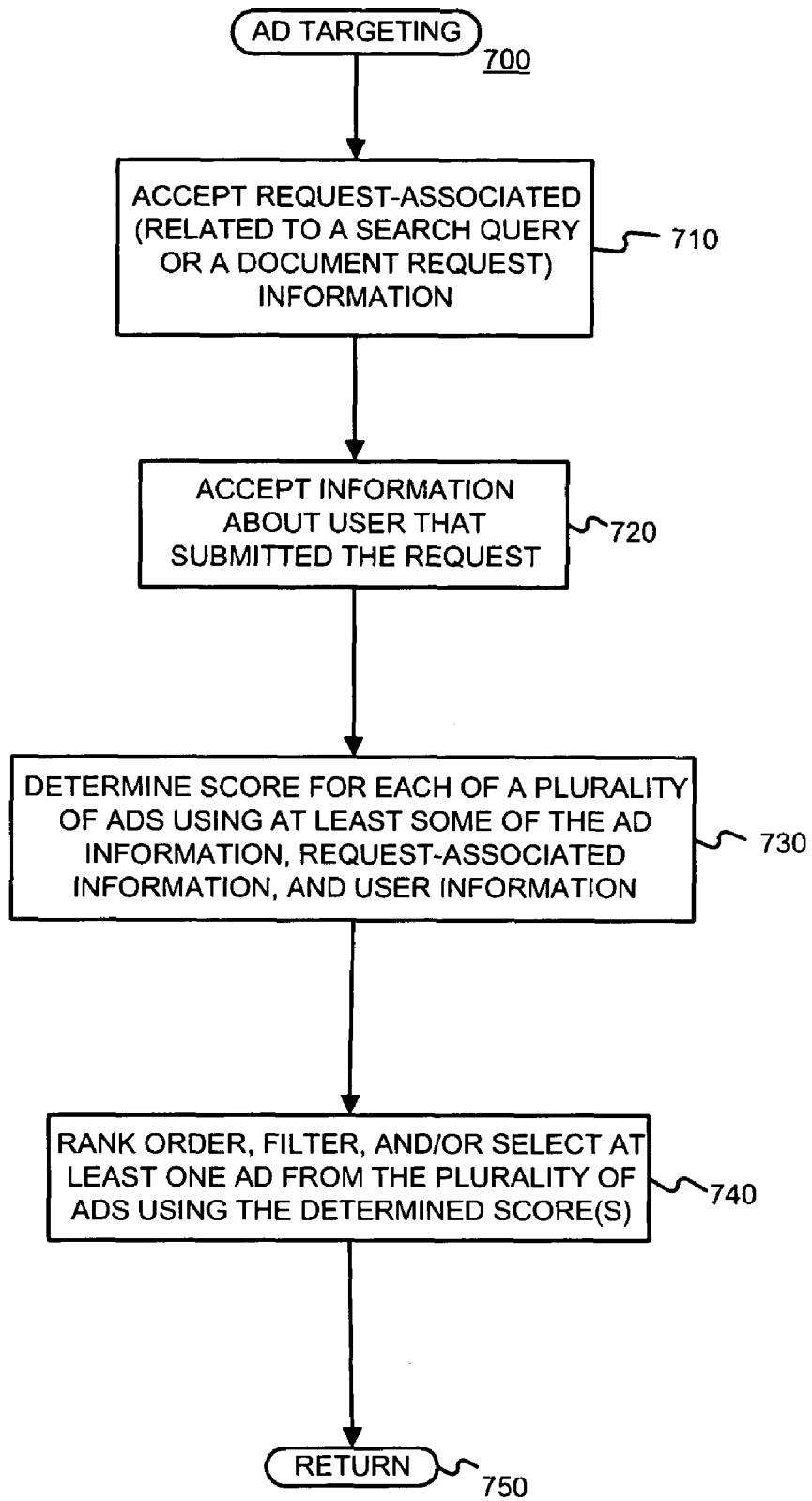
FIG. 7 is a flow diagram of a method that may be used for ad targeting in a manner consistent with the present invention.

FIG. 7 is a flow diagram of an exemplary method 700 that may be used to target advertisements in a manner consistent with the present invention. As shown in block 710, request-associated information (e.g., information associated with a user request such as a search query, a document request, etc.) is accepted. As shown in block 720, information about the user that submitted the search query (or that submitted a document request, or some other request) is accepted. This information may include user profile information and/or user behavior information. Items of user information may be provided and processed based, in some way, on their respective importance weights, such as described in §§4.2.4 and 4.2.5 above for example. Then, as shown in block 730, a score for each of a plurality of ads is determined using at least some of the ad information, request-associated information, and the user information. As shown in block 740, depending on the application of the present invention, at least one ad is rank ordered, filtered, and/or selected from the plurality of ads using at least the determined scores, before the method 700 is left via RETURN node 750. Exemplary techniques for determining ad scores are described in §4.2.5.4 below.

§4.2.5.2 Ad Creative Selection and Generation

Figure 8:
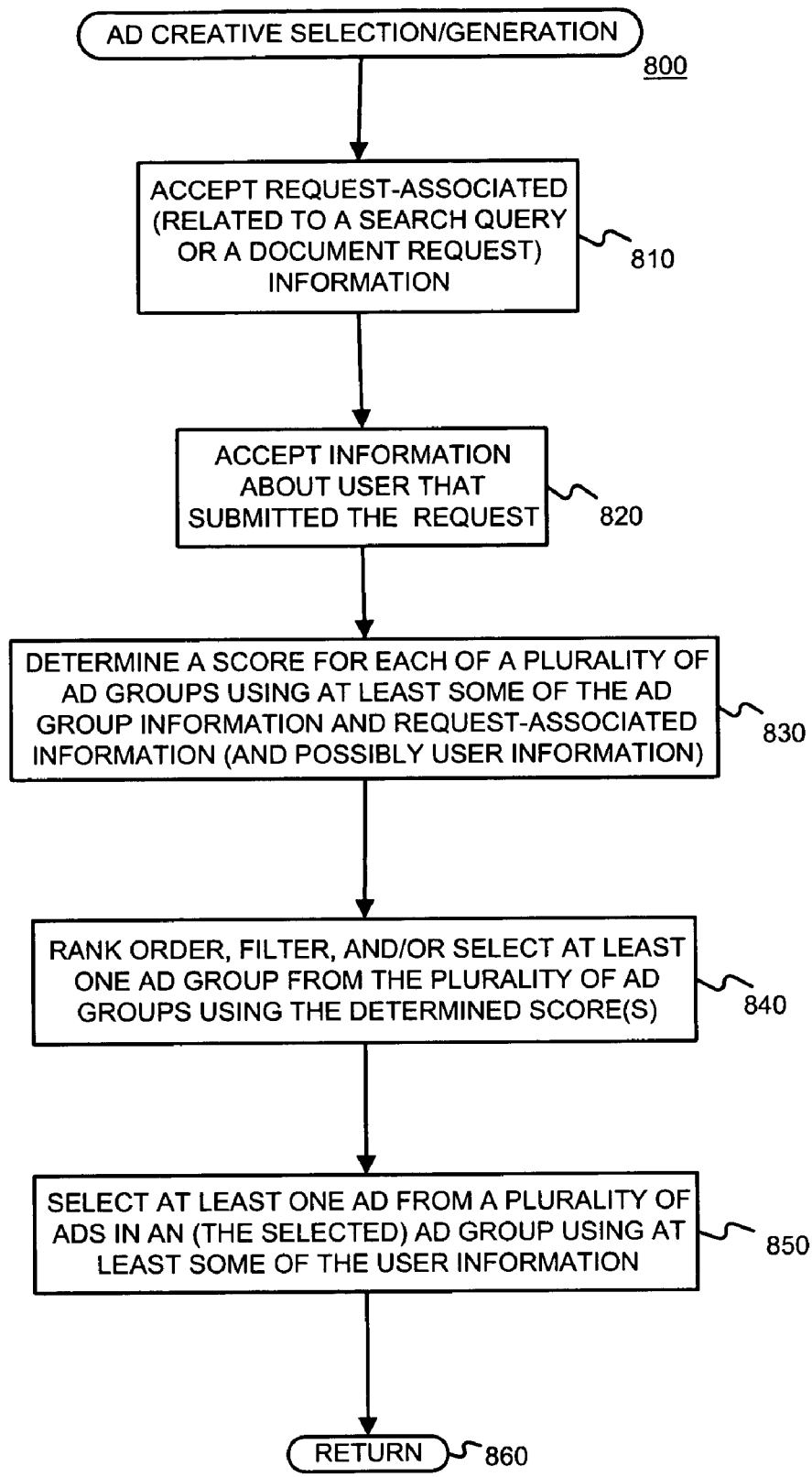
FIG. 8 is a flow diagram of a method that may be used for ad creative selection in a manner consistent with the present invention.

Automatic creative construction and/or selection allows ad creatives to be tailored to specific users, potentially based on a combination of information available about the user, the user request (e.g., search query or document request), and the information requested. FIG. 8 is a flow diagram of an exemplary method 800 that may be used to select and/or generate an ad creative in a manner consistent with the present invention. As indicated by block 810, request-associated information (e.g., information associated with a search query, a document request, etc.) is accepted. Also, as indicated by block 820, information about the user that submitted the request is accepted. This information may include user profile information and/or user behavior information. Items of user information may be provided and processed based, in some way, on their respective importance weights, such as described in §§4.2.4 and 4.2.5 above for example. Then, as shown in block 830, a score for each of a plurality of ad groups (or ad campaigns) is determined using at least some request-associated information and at least some ad group information. At least some user information may also be used in the determination of the score. Then, as shown in block 840, at least one of the ad groups is rank ordered, selected, and/or filtered using at least the determined score. Then, as shown in block 850, at least one ad from a plurality of ads in (e.g., a selected) an ad group (or ad campaign) is selected using at least some of the user information, before the method 800 is left via RETURN node 860. Exemplary techniques for performing ad group scoring are described in §4.2.5.4 below.

§4.2.5.3 Query Disambiguation

Besides selecting an appropriate ad or ad creative, user information may be used to disambiguate a search query including an ambiguous search term. For example, a user submitting the search query "jaguar" might want either (A)

information about Jaguar cars, information about the animal, information about the Apple Jaguar operating system, or information about the Jacksonville Jaguar NFL football team. User information could be used to help disambiguate the "jaguar" search term. In this example, information from the user's previous browsing activity may help disambiguate the ambiguous query "jaguar", or prevent the display of advertisements of little or no interest to the user. For example, if the user had been recently querying for "apple computer" and "operating systems", and subsequently submitted the search query "jaguar", the user's previous query history could be used to infer that the query was more likely referring to the operating system for Apple computers and not to the car, animal, or NFL team. Consequently, ads could be better targeted to the user by harnessing such information.

§4.2.5.4 Similarity Determination Techniques

The ad scoring processes introduced above may use some form of similarity or match between (a) advertisement information and (b) request-associated information and user information. Such a similarity determination can be performed in a number of ways. For example, one or more of the following similarity determination techniques may be used: (a) vector-based (as described below for example); (b) rule-based (as described below for example); (c) probabilistic reasoning to infer a probability or likelihood of match; and (d) fuzzy logic matching. Other similarly determination techniques may be used under the present invention as well.

As just alluded to, one way of matching user requests to ads is to form a vector using information about the user and their current request. Each of a plurality of advertisements also has a representative vector. Note that such feature vectors (for either the user or the advertisement) may also include additional information determined from historical data. For example, inferences about which demographic groups tend to click on an ad may be determined using data mining techniques. The results of this (e.g., off-line) analysis may then be used as one or more attributes in a feature vector of the ads. When information associated with the user request and user information is represented as a feature vector, and ads have associated feature vectors, such feature vectors can be matched using a scoring function such as the cosine distance between the vectors, a hamming distance, and/or any one of a variety of other vector distance measures. Advertisements can then be ranked using (e.g., according to) the scores generated by such a function. Naturally, the determination of ad rankings may use other information, such as price information and/or performance information for example. In one embodiment of the invention, the top ranking ads are served for rendering to the user.

As was also alluded to above, another technique for selecting ads involves applying a set of rules and/or functions that define a similarity of (a) ad information and (b) user information and request-associated information. Such a rule and/or formula-based system can use arbitrary combinations of logical rules (e.g., with weights attached) to give weighted scores to advertisements using at least some of the advertisement information, the user information and the request-associated information.

As stated above, both the vector-based techniques and the rules and/or formula-based techniques may be used in concert to generate a score for one or more advertisements with respect to user-request information.

In one embodiment of the present invention, a term frequency—inverse document frequency product (TF-IDF) measure is determined using the ad information, the user information, and the request-associated information to generate a similarity score. N-grams for the ad information may be additionally weighted according to the source and/or type of the ad information. For example, ad information explicitly defined (e.g., targeting keywords) may have a higher weight than ad information inferred or derived from other ad information (e.g., the advertiser's Website). The user information may be additionally weighted according to the importance measure, source, and/or type. Optional additional information item weighting may be determined using one or more of the following: (a) global and/or community weights, for example based on how often the feature has resulted in a good recommendation across all users, or across all similar users, and (b) other measures of importance (for example, "stop" words such as "the", "a", etc. may be given low or zero weights).

§4.2.5.4.1 Refinements to Similarity Determination Techniques

To keep the process of matching advertisements to user information and request-associated information efficient, feature selection, feature generalization, and/or feature aggregation techniques, such as those described in §4.2.4 above, may be used to reduce the sizes of the vectors being compared. For example, feature selection may be used to reduce the number and/or size of the features used as part of the matching process between (a) user and request-associated information and (b) ad information. Such feature selection techniques can include keeping only some number of features or information items having a high (in absolute and/or relative terms) importance weight in the vector representation of user and request-associated and/or ad information. Another feature selection technique may include using a statistical measure, such as "mutual Information", Chi-squared fit, or correlation for example, to determine which features are more indicative than others for generating one or more ad matches that are likely to perform well (e.g., be clicked on). Yet another feature selection technique is simply hand-selecting those features believed to be most useful. Two or more of these or other feature selection techniques may be used in concert.

Similarly, ad information vectors may be pre-filtered using some set of initial criteria (for example, matching certain features exactly) so that only a small subset of the ad information vectors remaining will need to be ranked with respect to the user and request-associated information. This technique illustrates a combined rule-based and vector distance similarity determination technique. Using this technique has the added advantage of helping to increase the efficiency of the overall matching process between user and request associated information and ad information.

Figure 10:
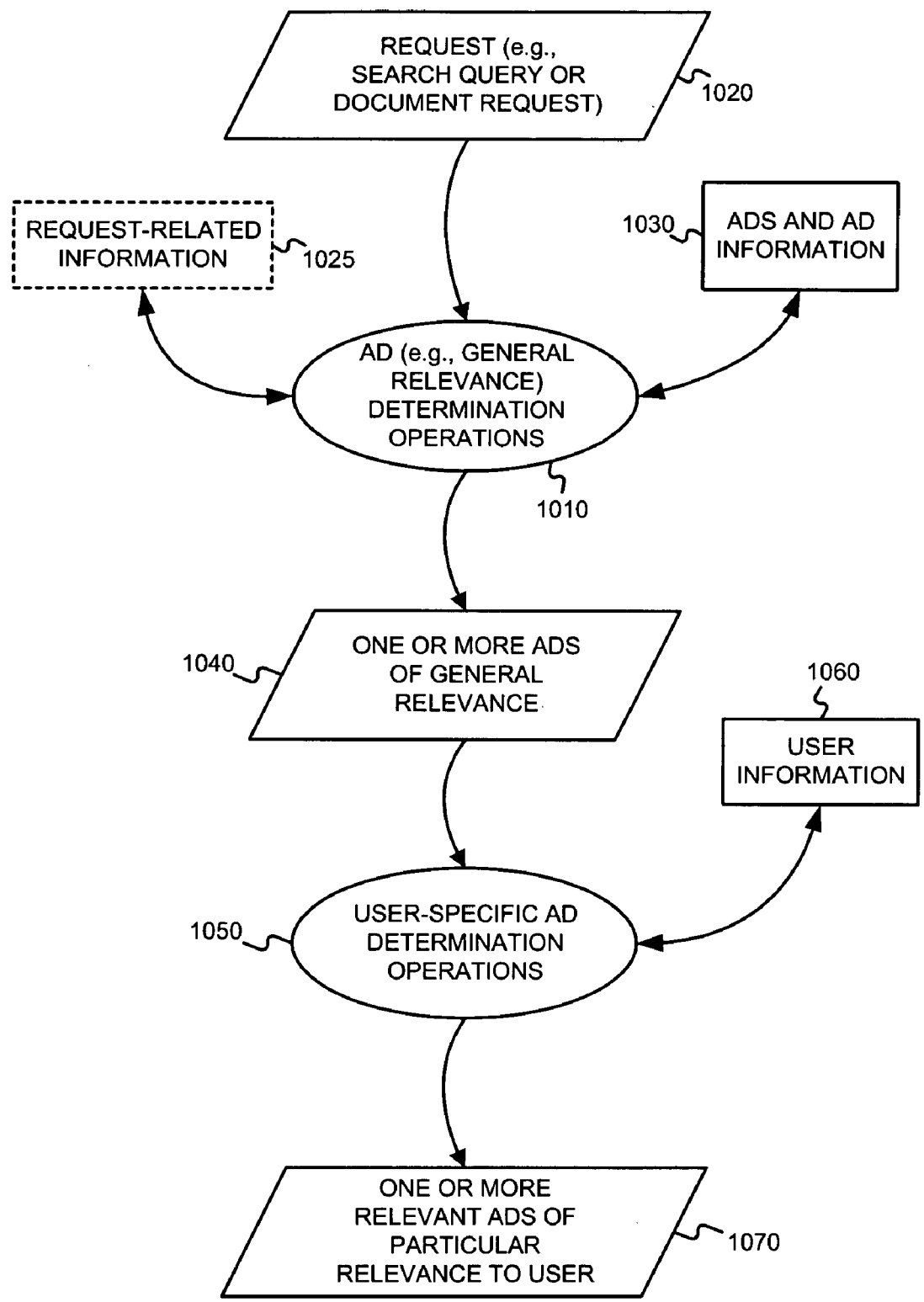
FIG. 10 is a diagram illustrating a two-stage ad serving technique consistent with the principles of the present invention.

FIG. 10 illustrates an alternative embodiment in which a first set of one or more ads 1040 generally relevant to a user request 1010 is determined first (e.g., using ad information 1030 such as keyword targeting information associated with the ads, and perhaps request-associated information 1025). This first set of one or more ads 1040 may be processed further by user-specific ad determination operations 1050 to determine a final set of ads 1070 (e.g., ordered and/or filtered based on a second similarity score determined using user information 1060). Such an embodiment may be useful when (part of) the user information is stored on the client. For example, an ad server may send the top N (e.g., N=100) ads for a user request (e.g., a search query or a document request)

to the client. The client can then reorder these served ads based on the local user information.

§4.2.6 Exemplary Apparatus

Figure 15:
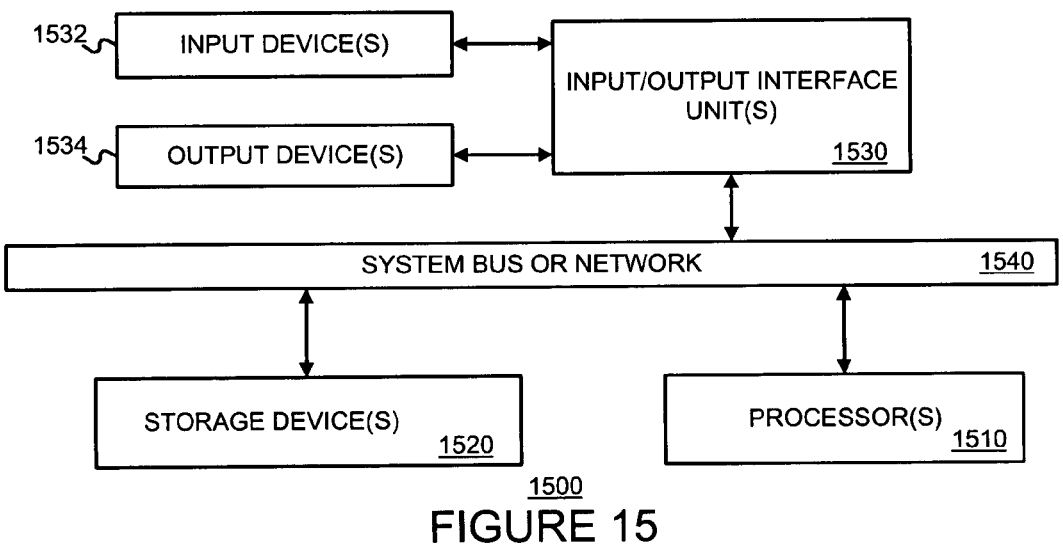
FIG. 15 is a high-level block diagram of apparatus that may be used to effect at least some of the various operations that may be performed, and to store information that may be used or generated, in a manner consistent with the present invention.

FIG. 15 is high-level block diagram of a machine 1500 that may effect one or more of the operations discussed above (e.g., those performed by an end user system or client device, those performed by a content server, those performed by a search engine, or those performed by an ad server). The machine 1500 basically includes one or more processors 1510, one or more input/output interface units 1530, one or more storage devices 1520, and one or more system buses and/or networks 1540 for facilitating the communication of information among the coupled elements. One or more input devices 1532 and one or more output devices 1534 may be coupled with the one or more input/output interfaces 1530.

The one or more processors 1510 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 1520 and/or may be received from an external source via one or more input interface units 1530.

In one embodiment, the machine 1500 may be one or more conventional personal computers. In this case, the processing units 1510 may be one or more microprocessors. The bus 1540 may include a system bus. The storage devices 1520 may include system memory, such as read only memory (ROM) and/or random access memory (RAM). The storage devices 1520 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 1532, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 1510 through an appropriate interface 1530 coupled to the system bus 1540. The output devices 1534 may include a monitor or other type of display device, which may also be connected to the system bus 1540 via an appropriate interface. In addition to (or instead of) the monitor, the personal computer may include other (peripheral) output devices (not shown), such as speakers and printers for example.

§4.3 EXAMPLES Of OPERATIONS

Figure 11:
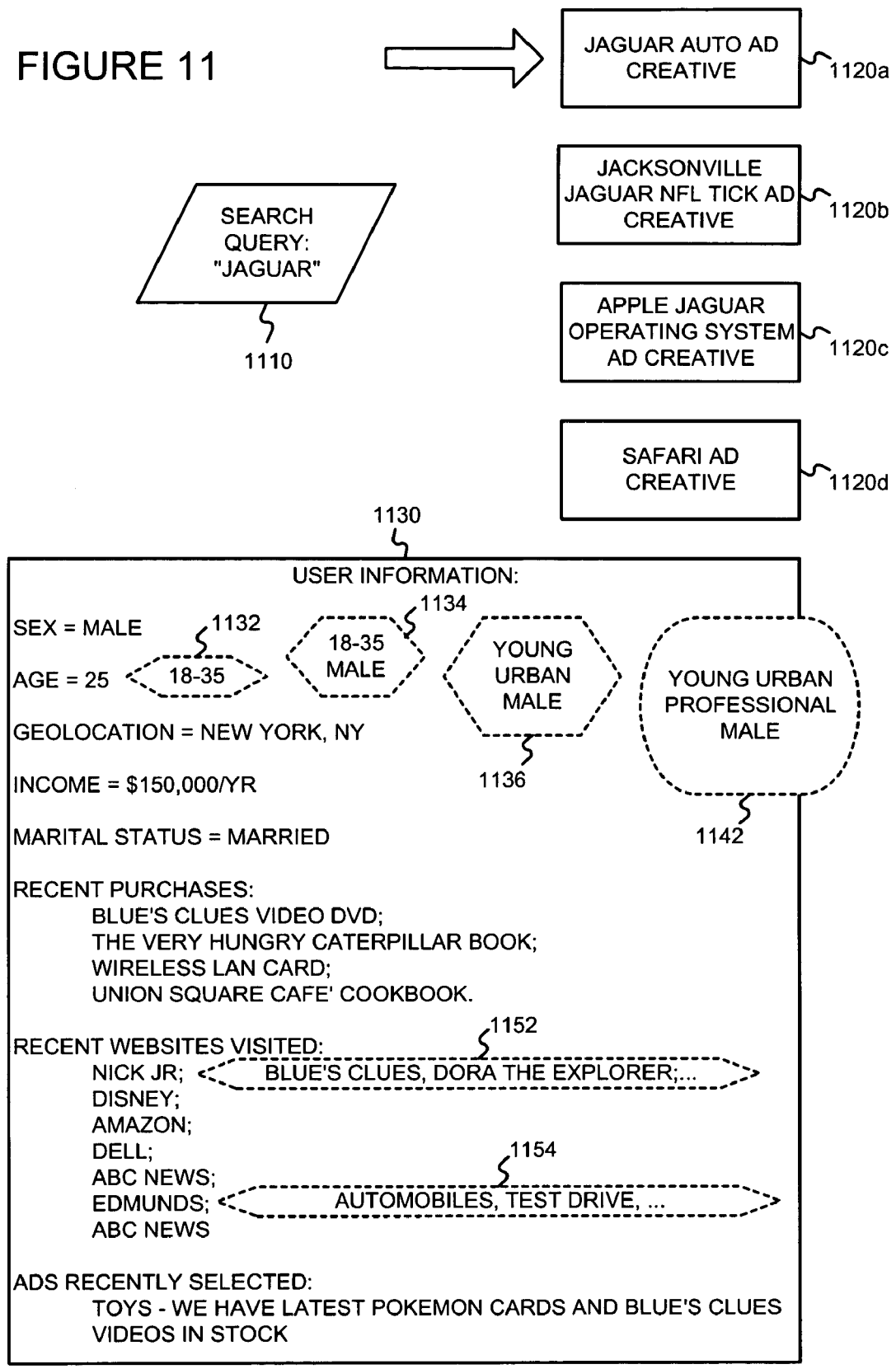

FIGS. 11 and 12 are illustrations of an exemplary application of the present invention to ad selection. As shown in FIG. 11, a number of ad creatives 1120 (which, in one embodiment of the present invention, belong to different ad groups or different ad campaigns) are relevant to the search query "jaguar" 1110. Unfortunately, the term "jaguar", by itself without context, can have different meanings. That is, an ad server would not know whether to serve an ad creative 1120a for Jaguar automobiles, an ad creative 1120b for the Jacksonville Jaguar NFL football team, an ad creative 1120c for the Jaguar Apple operating system, or an ad creative 1120d for a safari. Even if some of the ads had so-called negative keywords (e.g., if an advertiser specified that its ad creative 1120d should not be shown if a search query includes any of the terms "automobile," "car," "XJ6," "S-type," "X-type," "Jacksonville," "NFL," "football," "Apple," and "operating system"), such negative keywords would be of no help for the simple query "jaguar".

An embodiment of the present invention can use user information 1130 of the user that submitted the search query 110 to select the Jaguar auto ad creative 1120a. As shown, in this example the user information includes demographic information (or user profile information, such as sex, age, geolocation, income, and marital status, etc.) as well as user behavior information (such as recent purchases, recent Websites visited, ads recently selected, etc.) Notice that information can be generalized (e.g., age group 18-35 1132, 18-35 male 1134, and young urban male 1136) and assumptions can be made (e.g., young, urban professional male 1142). Notice the behavior information may include information extracted from Websites visited (e.g., terms 1152, 1154). In this example, given the term "automobile" extracted from the Edmunds Website recently visited, and the users demographic information, it is determined to serve the Jaguar auto ad creative 1120a.

As shown in FIG. 12, the same user later submits the search query "blues" 1210. Unfortunately, the term "blues", by itself without context, can have different meanings. That is, an ad server might would not know whether to serve an ad creative 1220a for records and compact disks (being associated with "classical," "jazz," "musicals," "blues," etc. keyword targeting 1222a), an ad creative 1220b for children's videos (being associated with "blue's clues," "sponge bob," etc. keyword targeting 1222b), or an ad creative 1220c for charter boat fishing (being associated with "offshore," "tuna," "blues," "charter," etc. keyword targeting 1222c). In this example, the user information 1230 is similar to that 1130 from FIG. 11, but the ads recently selected includes a new ad 1262. In this case, since the Nick Jr. Website visited by the user included the term "blue's clues" and since the user recently purchased a blue's clues video DVD, it is determined to serve the ad creative 1220b.

Figure 13:
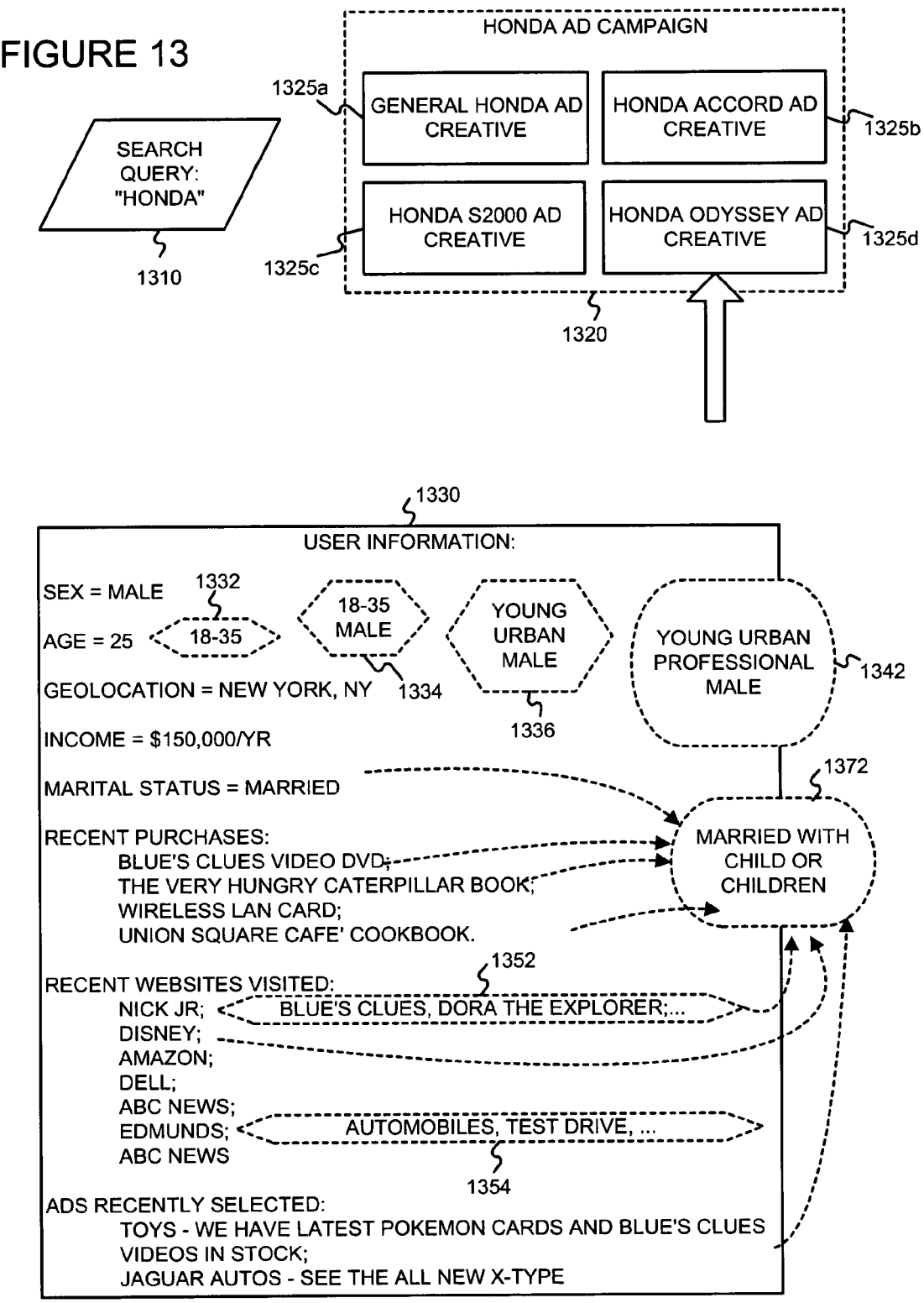
FIG. 13 is an illustration of an exemplary application of the present invention to ad creative selection.

FIG. 13 is an illustration of an exemplary application of the present invention to ad creative selection. In this example, the search query "Honda" matched a Honda ad campaign 1320. The Honda ad campaign includes more than one ad creative, namely, a general Honda ad creative 1325a, a Honda Accord ad creative 1325b, a Honda S2000 ad creative 1325c and a Honda Odyssey ad creative 1325d. In this example, based on assumed user information 1372, it is determined to serve the ad creative 1325. The assumed user information 1372 may be predetermined and stored as ad information 1330, or may be determined as needed. In this example, it is assumed that the user is married with one or more children based on marital status demographic information, recent purchases and ads recently selected.

§4.4 CONCLUSIONS

As can be appreciated from the foregoing disclosure, the present invention can be used to provide particularly relevant ads by using both request-associated information and user information.

What is claimed is:
1. A method comprising:
 a) accepting, by a system including at least one computer on a network, information associated with a user request;
 b) accepting, by the system, information about the user that submitted the user request; and c) determining, by the system a score for at least one advertisement using both the accepted information associated with a user request and the accepted information about the user.

2. The method of claim 1 wherein the user request is a search query.

3. The method of claim 1 wherein the user request is a document request.

4. The method of claim 1 wherein the act of determining a score includes determining a similarity between
   information associated with the at least one advertisement, and
   the accepted information associated with a user request and the accepted information about the user.

5. The method of claim 4 wherein the information related to the at least one advertisement is represented as a first feature vector,
   wherein the accepted information associated with a user request and the accepted information about the user is represented as a second feature vector, and
   wherein the similarity is determined using at least a cosine distance between the first feature vector and the second feature vector.

6. The method of claim 5 wherein each of at least some items of information of at least one of the first and second feature vectors have an associated importance weight, and
   wherein the similarity is determined using at least a cosine distance between at least a part of the first feature vector and at least a part of the second feature vector.

7. The method of claim 6 wherein the at least a part of the at least one of the first and second feature vectors includes items of information with the highest importance weights among the items of information of the first feature vector.

8. The method of claim 5 wherein each of at least some items of information of the first feature vector have an associated importance weight,
   wherein at least some of the items of information of the first feature vector are ordered in accordance with their importance weight,
   wherein each of at least some items of information of the second feature vector have an associated importance weight, and
   wherein at least some of the items of information of the second feature vector are ordered in accordance with their importance weight.

9. The method of claim 4 wherein the information associated with the at least one advertisement includes terms and term frequencies,
   wherein the accepted information associated with a user request and the accepted information about the user includes terms and term frequencies, and
   wherein the similarity is determined using at least a term frequency-inverse document frequency measure.

10. The method of claim 4 wherein the information associated with the at least one advertisement includes a first set of items of information,
    wherein the accepted information associated with a user request and the accepted information about the user includes a second set of items of information, and
    wherein each of the first and second items of information have associated importance weights, the associated importance weights being determined using at least a feature selection procedure selected from a group of feature selection procedures consisting of (A) mutual information, (B) chi-square fit, (C) correlation, and (D) manual selection.

11. The method of claim 4 wherein the information associated with the at least one advertisement includes a first set of items of information,
    wherein the accepted information associated with a user request and the accepted information about the user includes a second set of items of information, and
    wherein each of the first and second items of information have associated importance weights, the associated importance weights being determined using at least a performance of an advertisement served in the past, wherein the advertisement included a score that was determined using at least some of the first and second items of information.

12. The method of claim 1 further comprising:
    d) ordering, by the system, at least two of advertisements using their determined scores.

13. The method of claim 12 further comprising:
    e) determining, by the system, a final set of at least one advertisement using the ordering of the at least two advertisements.

14. The method of claim 1 further comprising:
    d) filtering, by the system, a first set of advertisements, using their determined scores, to generate a second set of advertisements.

15. The method of claim 1 wherein the user request is a search query and wherein the information associated with the user request includes at least one keyword from the search query.

16. The method of claim 1 wherein the user request is a document request and wherein the information associated with the user request includes document information.

17. The method of claim 1 wherein the user request is a search query and wherein the information associated with the user request includes document information of a search result page responsive to the search query.

18. The method of claim 1 wherein the information about the user includes geographic information.

19. The method of claim 1 wherein the information about the user includes user behavior information which includes at least one information item selected from a group of information items consisting of (A) information related to previous search queries submitted by the user, (B) information related to previous search queries submitted to a particular search engine by the user, (C) information related to previous advertisements served for rendering to the user, (D) information related to previous advertisements served for rendering by the user and selected, (E) document information of a document viewed by the user, and (F) previous on-line purchases by the user.

20. The method of claim 1 further comprising:
    d) serving, by the system, at least one advertisement using, at least, the determined score.

21. The method of claim 20 further comprising:
    e) accepting, by the system, user behavior responsive to the at least one advertisement served; and
    f) adjusting, by the system, one or more importance weights associated with one or more items of user information using, at least, the accepted user behavior.

22. The method of claim 21 wherein the accepted user behavior corresponds to a measure of performance of the advertisement.

23. The method of claim 21 wherein the score is determined using only a first set of items of user information, wherein the one or more items of user information having weights adjusted belong to a second set of items of user information, and wherein the second set of items of user information is larger than the first set of items of user information.

24. The method of claim 23 wherein the second set of items of user information includes the first set of items of user information.

25. The method of claim 1 wherein at least one of the accepted information associated with the user request and the accepted information about the user includes items of information having associated importance weights, and
   wherein the act of determining a score for at least one advertisement using both the accepted information associated with a user request and the accepted information about the user processes items of information in an order of their importance weights.

26. The method of claim 25 wherein the act of determining a score for at least one advertisement is terminated upon the occurrence of an event regardless of whether all items of information were considered in the score determination.

27. The method of claim 26 wherein the event is a timer expiration.

28. The method of claim 1 wherein the information about the user is inferred based on at least one of (A) other features of the user, and (B) features of other similar users.

29. Apparatus comprising:
   a) an input for accepting
      i) information associated with a user request, and
      ii) information about the user that submitted the user request;
   b) at least one processor; and
   c) at least one storage device storing processor-executable instructions which, when executed by the at least one processor, cause the at least one processor to perform a method including determining a score for at least one advertisement using both the accepted information associated with a user request and the accepted information about the user.

30. The apparatus of claim 29 wherein the user request is a search query.

31. The apparatus of claim 29 wherein the user request is a document request.

32. The apparatus of claim 29 wherein the act of determining a score includes determining a similarity between
   information associated with the at least one advertisement, and
   the accepted information associated with a user request and the accepted information about the user.

33. The apparatus of claim 32 wherein the information related to the at least one advertisement is represented as a first feature vector,
   wherein the accepted information associated with a user request and the accepted information about the user is represented as a second feature vector, and
   wherein the similarity is determined using at least a cosine distance between the first feature vector and the second feature vector.

34. The apparatus of claim 33 wherein each of at least some items of information of at least one of the first and second feature vectors have an associated importance weight, and
   wherein the similarity is determined using at least a cosine distance between at least a part of the first feature vector and at least a part of the second feature vector.

35. The apparatus of claim 34 wherein the at least a part of the at least one of the first and second feature vectors includes items of information with the highest importance weights among the items of information of the first feature vector.

36. The apparatus of claim 33 wherein each of at least some items of information of the first feature vector have an associated importance weight, and wherein each of at least some items of information of the second feature vector have an associated importance weight, the method further including ordering
   i) at least some of the items of information of the first feature vector in accordance with their importance weight, and
   ii) at least some of the items of information of the second feature vector in accordance with their importance weight.

37. The apparatus of claim 32 wherein the information associated with the at least one advertisement includes terms and term frequencies,
   wherein the accepted information associated with a user request and the accepted information about the user includes terms and term frequencies, and
   wherein the means for determining similarity uses at least a term frequency-inverse document frequency measure.

38. The apparatus of claim 32 wherein the information associated with the at least one advertisement includes a first set of items of information,
   wherein the accepted information associated with a user request and the accepted information about the user includes a second set of items of information, and
   wherein each of the first and second items of information have associated importance weights, the method further including determining the associated importance weights using at least a feature selection procedure selected from a group of feature selection procedures consisting of (A) mutual information, (B) chi-square fit, (C) correlation, and (D) manual selection.

39. The apparatus of claim 32 wherein the information associated with the at least one advertisement includes a first set of items of information,
   wherein the accepted information associated with a user request and the accepted information about the user includes a second set of items of information, and
   wherein each of the first and second items of information have associated importance weights, the method further including determining the associated importance weights using at least a performance of an advertisement served in the past, wherein the advertisement included a score that was determined using at least some of the first and second items of information.

40. The apparatus of claim 29 wherein the method further includes ordering at least two of advertisements using their determined scores.

41. The apparatus of claim 40 wherein the method further includes determining a final set of at least one advertisement using the ordering of the at least two advertisements.

42. The apparatus of claim 29 wherein the method further includes filtering a first set of advertisements, using their determined scores, to generate a second set of advertisements.

43. The apparatus of claim 29 wherein the user request is a search query and wherein the information associated with the user request includes at least one keyword from the search query.

44. The apparatus of claim 29 wherein the user request is a document request and wherein the information associated with the user request includes document information.

45. The apparatus of claim 29 wherein the user request is a search query and wherein the information associated with the user request includes document information of a search result page responsive to the search query.

46. The apparatus of claim 29 wherein the information about the user includes geographic information.

47. The apparatus of claim 29 wherein the information about the user includes user behavior information which includes at least one information item selected from a group of information items consisting of (A) information related to previous search queries submitted by the user, (B) information related to previous search queries submitted to a particular search engine by the user, (C) information related to previous advertisements served for rendering to the user, (D) information related to previous advertisements served for rendering by the user and selected, (E) document information of a document viewed by the user, and (F) previous on-line purchases by the user.

48. The apparatus of claim 29 further comprising:
   c) an ad server for serving at least one advertisement using, at least, the determined score.

49. The apparatus of claim 48 wherein the method further includes accepting user behavior responsive to the at least one advertisement served; and
   adjusting one or more importance weights associated with one or more items of user information using, at least, the accepted user behavior.

50. The apparatus of claim 49 wherein the accepted user behavior corresponds to a measure of performance of the advertisement.

51. The apparatus of claim 49 wherein the act of determining a score uses only a first set of items of user information, wherein the one or more items of user information having weights adjusted belong to a second set of items of user information, and wherein the second set of items of user information is larger than the first set of items of user information.

52. The apparatus of claim 51 wherein the second set of items of user information includes the first set of items of user information.

53. The apparatus of claim 29 wherein at least one of the accepted information associated with the user request and the accepted information about the user includes items of information having associated importance weights, and
   wherein the act of determining a score for at least one advertisement uses both the accepted information associated with a user request and the accepted information about the user processes items of information in an order of their importance weights.

54. The apparatus of claim 53 wherein the act of determining a score for at least one advertisement terminates determination processing upon the occurrence of an event regardless of whether all items of information were considered in the score determination.

55. The apparatus of claim 54 wherein the event is a timer expiration.

56. A method comprising:
   a) accepting, by a system including at least one computer on a network, information associated with a user request;
   b) accepting, by the system, information about the user that submitted the user request; and
   c) determining, by the system, a score for an advertisement using at least a similarity between
      a first feature vector including information associated with the advertisement, and
      a second feature vector including the accepted information associated with a user request and the accepted information about the user.

57. The method of claim 56 wherein the similarity is determined using at least a distance between the first feature vector and the second feature vector.

58. Apparatus comprising:
   a) an input for accepting
      i) information associated with a user request, and
      ii) information about the user that submitted the user request;
   b) at least one processor; and
   c) at least one storage device storing processor-executable instructions which, when executed by the at least one processor, cause the at least one processor to perform a method including determining a score for an advertisement using at least a similarity between (1) a first feature vector including information associated with the advertisement, and (2) a second feature vector including the accepted information associated with a user request and the accepted information about the user.

59. The apparatus of claim 58 wherein the similarity is determined using at least a distance between the first feature vector and the second feature vector.

* * * * *